US011606351B2

(12) United States Patent
Dürr et al.

(10) Patent No.: US 11,606,351 B2
(45) Date of Patent: Mar. 14, 2023

(54) SECOND FACTOR BASED REALM SELECTION FOR FEDERATED AUTHENTICATIONS

(71) Applicant: International Business Machines Corporation, Armonk, NY (US)

(72) Inventors: Thomas Dürr, Magstadt (DE); Michael Baessler, Bempflingen (DE); Holger Koenig, Boblingen (DE); Oliver Koeth, Stuttgart (DE); Thomas Schwarz, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 17/122,519

(22) Filed: Dec. 15, 2020

(65) Prior Publication Data

US 2022/0191192 A1    Jun. 16, 2022

(51) Int. Cl.
*H04L 9/40* (2022.01)

(52) U.S. Cl.
CPC ...... *H04L 63/0838* (2013.01); *H04L 63/0846* (2013.01); *H04L 63/102* (2013.01); *H04L 63/0815* (2013.01)

(58) Field of Classification Search
CPC ............ H04L 63/0838; H04L 63/0846; H04L 63/102; H04L 9/40; H04L 63/0815
See application file for complete search history.

(56) References Cited

U.S. PATENT DOCUMENTS

| 7,568,218 | B2 * | 7/2009 | Garg .................... H04L 63/10 713/185 |
| 9,191,381 | B1 * | 11/2015 | Popp ............... H04L 63/0823 |
| 9,419,968 | B1 | 8/2016 | Pei et al. |
| 2003/0065940 | A1 | 4/2003 | Brezak |
| 2009/0328178 | A1 * | 12/2009 | McDaniel ............ H04L 9/3271 726/5 |
| 2010/0319059 | A1 | 12/2010 | Agarwal |
| 2012/0216267 | A1 * | 8/2012 | Austel .................. H04L 67/563 726/8 |

(Continued)

FOREIGN PATENT DOCUMENTS

WO     2020236135 A1    11/2020

OTHER PUBLICATIONS

"Collaborate & Create Amazing Graphic Design for Free", Canva, Printed Nov. 3, 2020, 5 pages, <https://www.canva.com/>.

(Continued)

*Primary Examiner* — Jayesh M Jhaveri
(74) *Attorney, Agent, or Firm* — Edward J. Wixted, III

(57) ABSTRACT

In an approach for authentication of a username, a processor maintains a mapping of usernames and realms. A processor receives a username and a time-based one-time password code (TOTP code) for the username based on an authentication application. A processor, upon receiving the TOTP code: determines a realm from the mapping based on the received username and the received TOTP; and requests an entry of a credential relating to the username in the realm. A processor, upon receiving of the requested credential, authenticates the username by determining that the received credential matches an expected credential for the realm.

25 Claims, 6 Drawing Sheets

(56) References Cited

U.S. PATENT DOCUMENTS

| | | | |
|---|---|---|---|
| 2014/0026205 A1* | 1/2014 | Guo | H04L 9/3234 |
| | | | 726/9 |
| 2014/0075529 A1 | 3/2014 | Gordon et al. | |
| 2014/0337954 A1* | 11/2014 | Ahmed | H04L 63/0815 |
| | | | 726/8 |
| 2015/0281211 A1 | 10/2015 | Jøsang | |
| 2017/0295166 A1* | 10/2017 | Guo | G06F 16/951 |
| 2017/0339626 A1 | 11/2017 | Pekka | |
| 2020/0021574 A1* | 1/2020 | Pinner | H04L 63/102 |
| 2020/0074070 A1 | 3/2020 | Boodaei | |
| 2020/0153814 A1 | 5/2020 | Smolny et al. | |
| 2020/0228520 A1 | 7/2020 | Thampi | |
| 2021/0014224 A1* | 1/2021 | Gordon | H04L 12/2809 |

OTHER PUBLICATIONS

Mell et al., "The NIST Definition of Cloud Computing", Recommendations of the National Institute of Standards and Technology, Special Publication 800-145, Sep. 2011, 7 pages.

Rahav, Amit, "Securing Your Federated Identity Management", OctopusBlog, Oct. 17, 2017, 7 pages, <https://doubleoctopus.com/blog/blogsecuring-federated-identity/>.

Raihi et al.,"TOTP: Time-Based One-Time Password Algorithm", Internet Engineering Task Force (IETF), May 2011, 16 pages, <https://tools.ietf.org/html/rfc6238>.

Sakimura et al., "OpenID Connect Core 1.0 incorporating errata set 1", OpenID, Nov. 8, 2014, 98 pages, <https://openid.net/specs/openid-connect-core-1_0.html>.

Terp, Ryan, "Multiple Second Factor Realm Authentication (Realm Chaining)", SecureAuth, Nov. 11, 2019, 21 pages, <https://docs.secureauth.com/pages/viewpage.action?pageId=15861043>.

* cited by examiner

ID

SECOND FACTOR BASED REALM SELECTION FOR FEDERATED AUTHENTICATIONS

BACKGROUND

The present invention relates generally to the field of authentication of a username, and more particularly to an authentication of a username in a cloud computing environment with an automatic selection of a realm.

The trend to use cloud computing resources operated by a cloud provider instead of maintaining applications in-house/on-site is unbroken. The topic "cloud" remains one of the top three priorities of CIOs. The ongoing trend towards use of hybrid clouds and more complex cloud computing offerings, however, is also becoming a burden for IT organizations and users. As cloud computing centers continue to grow and computing and storage capacity increases, access to such resources may also become more complex. This has to be combined with the complexity involved in a more secure access to cloud computing resources. Two-factor authentication has become a requirement for many vertical industries that is very often governed by government regulations.

Now, large clouds do often support a federated login with customer owned user repositories. Thereby, each such repository may be represented by an identifier, denoted as "realm" ID. However, realm identifiers can be long complex encrypted IDs (identifiers). For a user, it is not easy or completely impossible to remember the cryptic IDs. Typically, the target scope ID has to be selected manually during the search, as user names are not unique in all user repositories. In addition, manual realm selection may involve a large number of realms, which can make it impossible to select the correct one. From a user perspective, this problem exists for basically every serious cloud computing provider.

However, also the alternative to realm select fields, i.e., static realm lists, share basically the same limitations and restrictions as just described.

From a security perspective, a second-factor authentication, also denoted as two-factor authentication, is state-of-the-art to prevent password attacks. Such second factors may be implemented using time-based one-time passwords or, a time-based one-time password code (TOTP code). Thereby, the TOTP mechanism is set up for each user per realm on the authentication server used and exported into a client-app. The TOTP code generated by the client-app is only valid for a certain amount of time and must be provided after an input of a username/password combination to be validated on the authentication server. This process is basically the same for all reputable cloud providers. However, it remains a cumbersome process due to the requirement to type in all selected realm identifier.

There are several documents known describing the technical context of the here proposed solution. U.S. Pat. No. 9,419,968 B1 describes a mobile push user authentication for a native client based logon. Thereby, an authentication server receives from a user interface at a native client a password for native-client-based logon to a remote server. The method determines whether a portion of the passport includes a one-time password (OTP). When the password includes an OTP, the method validates the remaining portion of the passport as a first authentication factor, and validates the OTP as a second authentication.

Additionally, U.S. Patent Application Publication No. 2020/0153814 A1 describes a method for an authentication with identifier providers via a federating authorization server, wherein the federating authorization server has at least one interface to at least one identity provider. Each identifier provider is configured to validate user identities using a respective validation method. Thereby, the method comprises: receiving login data via a webpage, the login data indicating at least an identity provider and a user.

However, the known disadvantages of the need to enter an identification of a realm, in particular represented by a complex or cryptic identifier, in a cloud computing environment remains. Therefore, there is a need to overcome this limitation of current solutions and providing easy access to cloud computing realms in large cloud computing systems.

SUMMARY

According to one aspect of the present invention, a computer-implemented method for an authentication of a username may be provided. The method may comprise maintaining a mapping of usernames and realms and receiving a username and a time-based one-time password code (TOTP code) for the username based on an authentication application. The method may further include, upon receiving the TOTP code, determining a realm from the mapping based on the received username and the received TOTP, and requesting an entry of a credential relating to the username in the realm. Moreover, the method may include, upon receiving of the requested credential, authenticating the username by determining that the received credential matched an expected credential for the realm.

According to another aspect of the present invention, an authentication system for an authentication of a username may be provided. The authentication system may comprise a memory communicatively coupled to a processor, the memory storing program code portions adapted to enable the processor to perform maintaining a mapping of usernames and realms, and receiving a username and a time-based one-time password code (TOTP code) for the username based on an authentication application.

Additionally, the authentication system may comprise upon receiving the TOTP code, determining a realm from the mapping based on the received username and the received TOTP, and requesting an entry of a credential relating to the username in the realm.

Furthermore, the method may comprise upon receiving of the requested credential authenticating the username by determining that the received credential matched an expected credential for the realm.

The proposed method for an authentication of a username may offer multiple advantages, technical effects, contributions and/or improvements:

The user acceptance, i.e., the user-friendliness, in large and complex cloud computing environments, may be increased. In contrast to known techniques, a login is no longer restricted and does no longer require to manually selecting a realm from long lists which may comprise cryptic (realm-)IDs. This may significantly increase the user experience with the selected cloud computing login process.

One may also observe an improved security. i.e., no password attacks possible. since a password-field will not become available in a user interface before a successful TOTP process. It may also help to motivate users and customers to enable second-factor authentication methods for their repositories in cloud computing environments which, in turn, also may increase the security of data and applications stored and operated in the cloud computing environment.

Thus, the traditional sequence of logging into a realm, namely, selecting a realm, providing a username, validate a password and validate a TOTP code, is changed significantly and advantageously in that the sequence now may be: providing a username, validating a TOTP code and automatically selecting a realm by means of the known TOTP code. Finally, the password for the realm is validated. Hence, the sequence is changed with the positive effect that the user no longer needs to care about the realm ID.

In the following, additional embodiments of the inventive concept will be described.

According to a useful embodiment, the method may also comprise receiving the username and the TOTP code in two steps. Hence, a user may confirm the username in a first step, e.g., by pressing "enter," and the TOTP code in a second step, e.g., by pressing "enter" a second time for confirming the respective passcode or by clicking on a confirmation field of a user interface.

According to another interesting embodiment, the method may also comprise providing a user-interface adapted for receiving the username and/or the TOTP code. Hence, the user may enter the username and the TOTP code in one single transaction. This may increase an acceptance value of a user experience of the here proposed solution. Hence, and according to another embodiment, the method may also comprise—receiving the username and the TOTP code in a one-step process, thereby increasing the usability even more.

According to a permissive embodiment of the method, the user interface may be a graphical user interface or a command line interface. Basically, any type of user interface may be used. This may also have the advantage that—in case portions of the user interface may be implemented as APIs (application programming interface)—the authentication may also be implemented using another program.

According to an advantageous embodiment of the method, the realm may be selected out of the group consisting of: an application in a cloud computing environment, a marketplace, a software development environment, a social media platform component, and an Internet shop. Basically, any application or application group requiring an authentication of a user in a cloud computing environment, in which different realms may be present are implementable, the proposed concept may advantageously be used.

According to a further preferred embodiment of the method, the maintaining the mapping may be performed by an authentication server. This may have the advantage, that a trusted system, i.e., the authentication server, may be used for a reliable mapping of the different variables required for a secured and easy login in a multi-realm computing environment.

According to one enhanced embodiment of the method, the authentication application may be a client-side TOTP code generator.

According to an enhanced embodiment of the method, the mapping may also comprise the TOTP code. Hence, for a most complete mapping relationship, all three elements may be present: the username, the realm identifier and the TOTP code. Having these three elements available, a straight forward authentication for the username for a specific realm may be achieved successfully.

According to one additional embodiment of the method, the mapping may be performed using a table, a linked list or a database. Additionally, also other mapping mechanisms known to a skilled person in the art may be used. However, it may be required and that the triplet comprising the username, the realm—i.e., a realm identifier—and the TOTP code may be accessible directly.

According to an optional embodiment, the method may also comprise determining that the TOTP code is still valid, and upon the TOTP code no longer being valid, terminating a process underlying the method. In this case, not any authentication and not any pre-selection of a realm are possible.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

DETAILED DESCRIPTION

Figure 1:
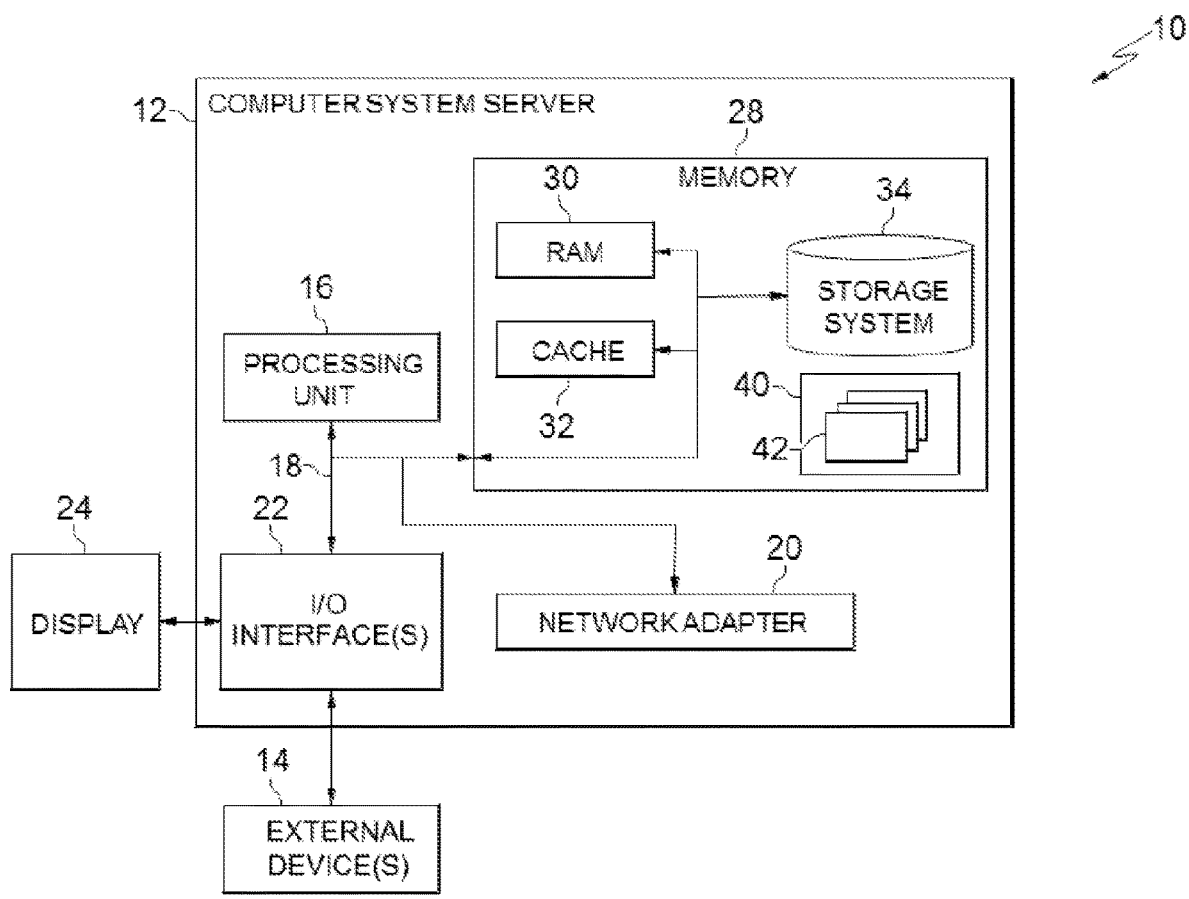
FIG. 1 depicts a cloud computing node according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
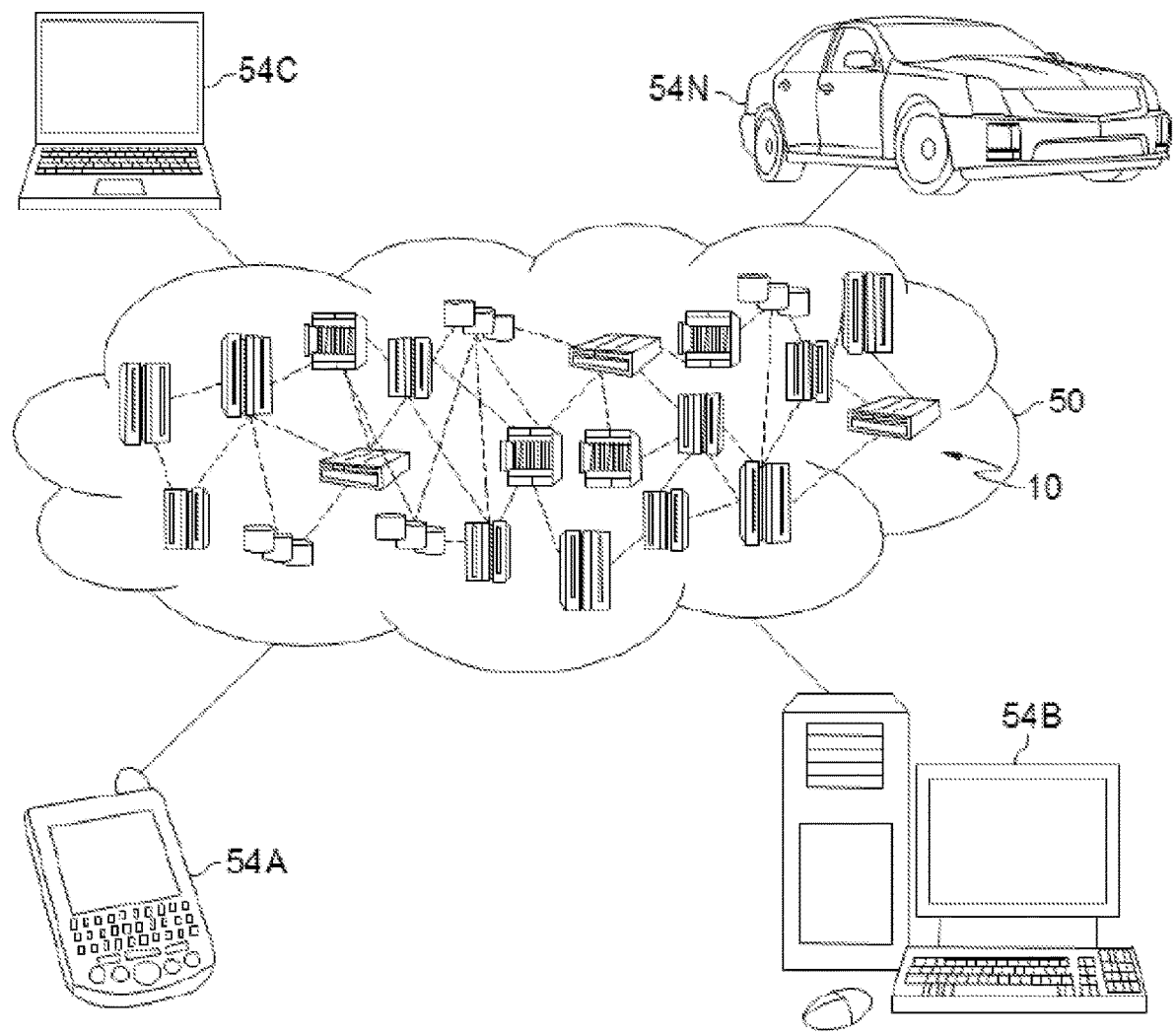
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
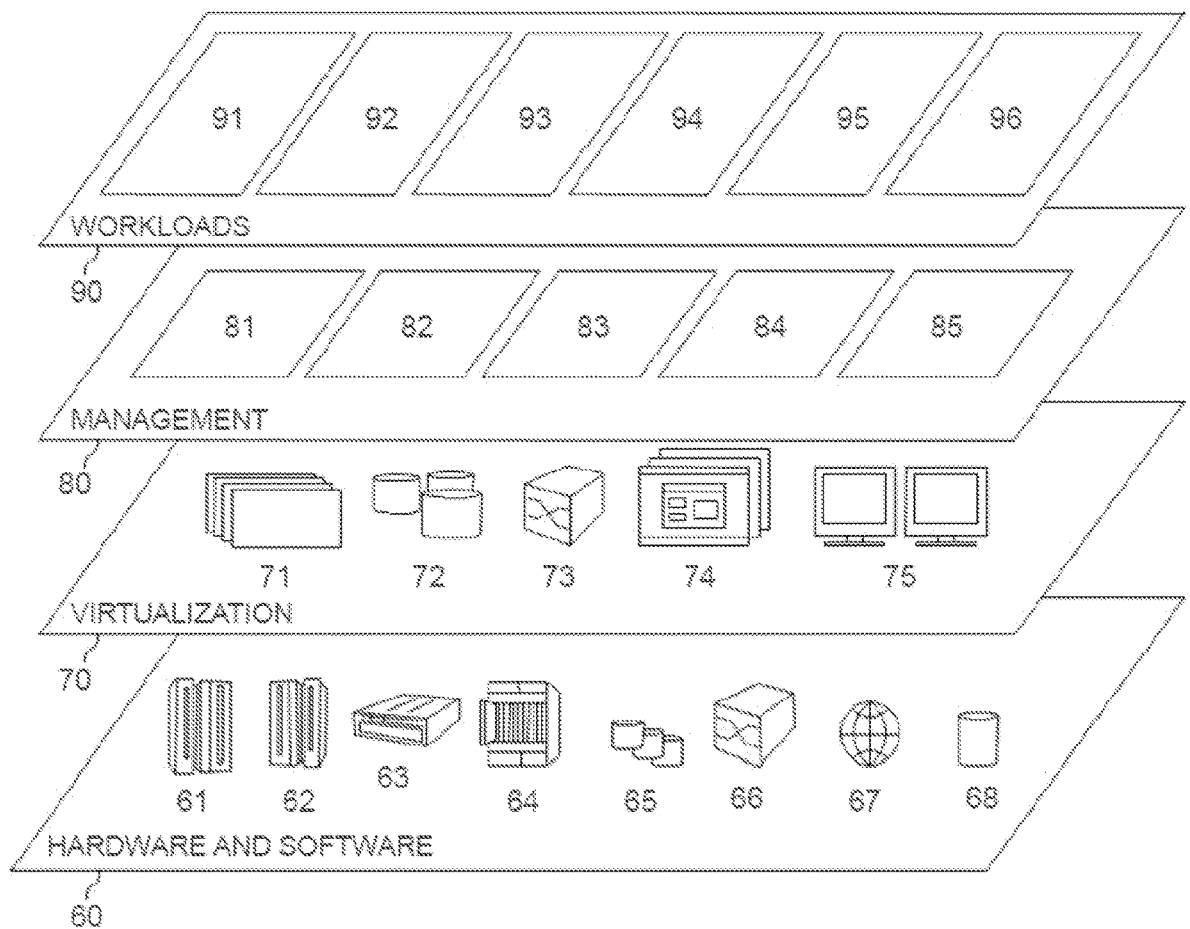
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and authentication 96.

In the context of this description, the following conventions, terms and/or expressions may be used:

The term 'authentication' may denote a process of validating a user identifier (UID) and, based on that, granting access to a specific computing resource, e.g., an application, a storage space, a network component, etc.

The term 'username' may denote an identifier of a user account which may be used as a login identifier contained in a realm of a complex cloud computing environment.

The term 'realm' may denote a sub group of dynamically configurable computing resources in a larger cloud computing environment. A realm may thus be a specific view on a limited portion of the larger cloud computing environment.

The term 'time-based one-time password code'—in short, 'TOTP code'—may denote a digital code being only valid for a predefined time period. If the predefined time period may expire, the TOTP code may no longer be usable. The TOTP code for a specific user ID—i.e., username or UID—may be made available by a specific authentication application. The skilled person may also know alternatives to these popular client-side authentication applications.

The term 'authentication application' may denote an application available independently of the cloud computing environment and being installed on a client-side computing system adapted for generating a TOTP code.

The term 'credential' may denote a secret digital code enabling an access to computing resources together with a username. Once the username and the credential or password are made available, the username and credentials combination may be compared to a previously saved username/credentials combination. In case of a match, access may be given to a requested resource.

It may be noted that cloud software takes full advantage of the cloud paradigm by being service-oriented with a focus on statelessness (with exceptions), low coupling, modularity, and semantic interoperability.

In the following, a detailed description of the figures and related embodiments will be given. All instructions in the figures are schematic. Firstly, a block diagram of an embodiment of the inventive method for an authentication of a username is given. Afterwards, further embodiments, as well as embodiments of the authentication system for an authentication of a username, will be described.

Figure 4:
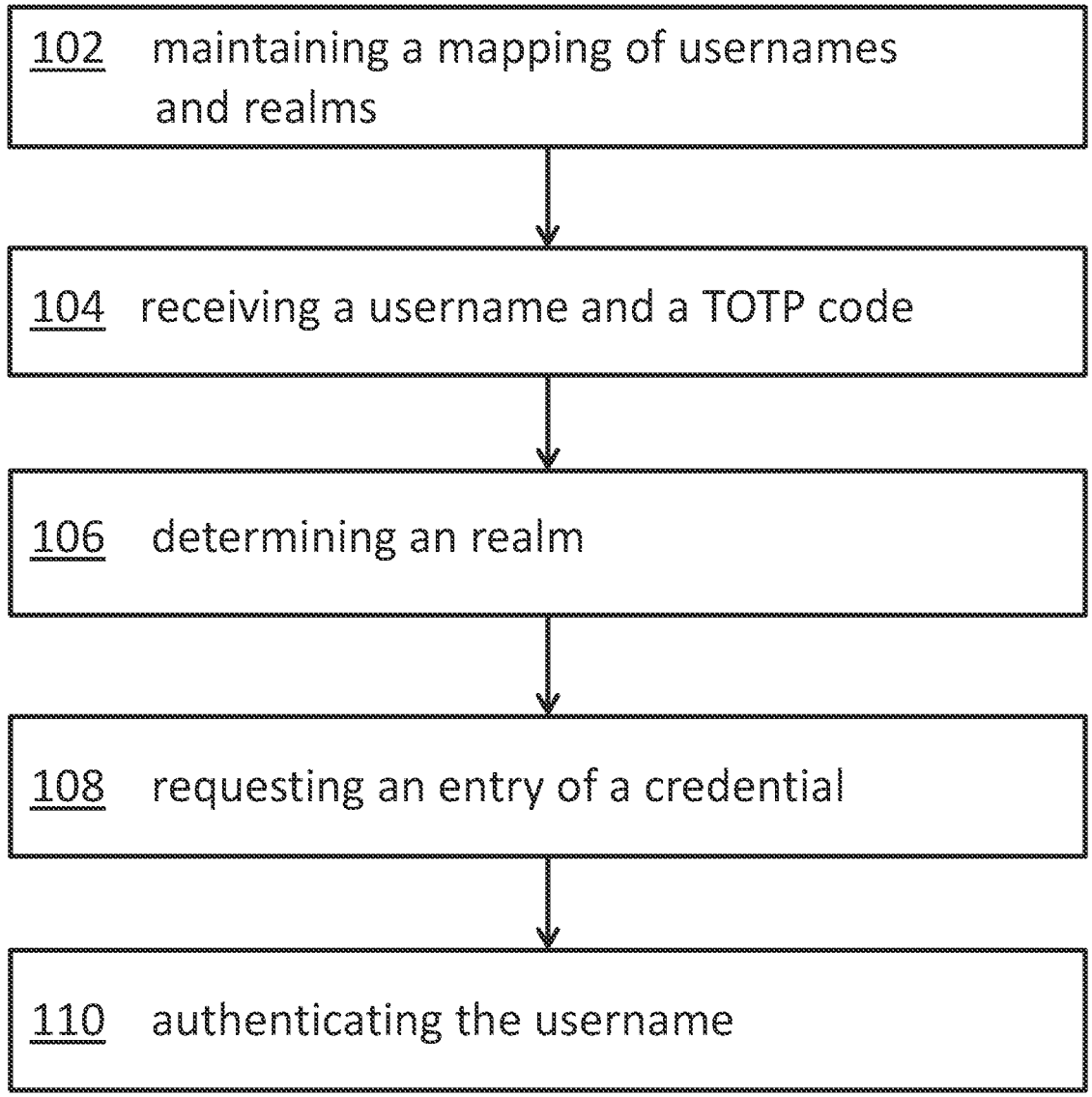
FIG. 4 is a flowchart depicting operational steps of an approach for authentication of a username, in accordance with an embodiment of the present invention.

FIG. 4 shows a block diagram of a preferred embodiment of the process 100 for authentication of a username. A successful authentication can be provided to an access to, e.g., a cloud application, cloud computing resource (e.g. storage and data) or, marketplaces, a web app, etc. The process comprises maintaining, in step 102, a mapping of usernames and realms, receiving, in step 104, a username—preferably by a user interface, alternatively via an API—and a time-based one-time password code (TOTP code)—e.g., potentially selected based on user preferences, e.g., related to privileges—for the username based on an authentication application which may be executed client-side. Thereby, the realm management system automatically selects the correct realm.

The process 100 also comprises, upon receiving the TOTP code, determining, in step 106, a realm from the mapping based on the received username and the received TOTP, and requesting, in step 108, an entry of a credential e.g., a password relating to the username in the realm.

The process 100 further comprises upon receiving of the requested credential authenticating, in step 110, the username by determining that the received credential matched an expected credential for the realm. If the received credential does not match an expected credential for the real, the access shall be rejected.

Figure 5:
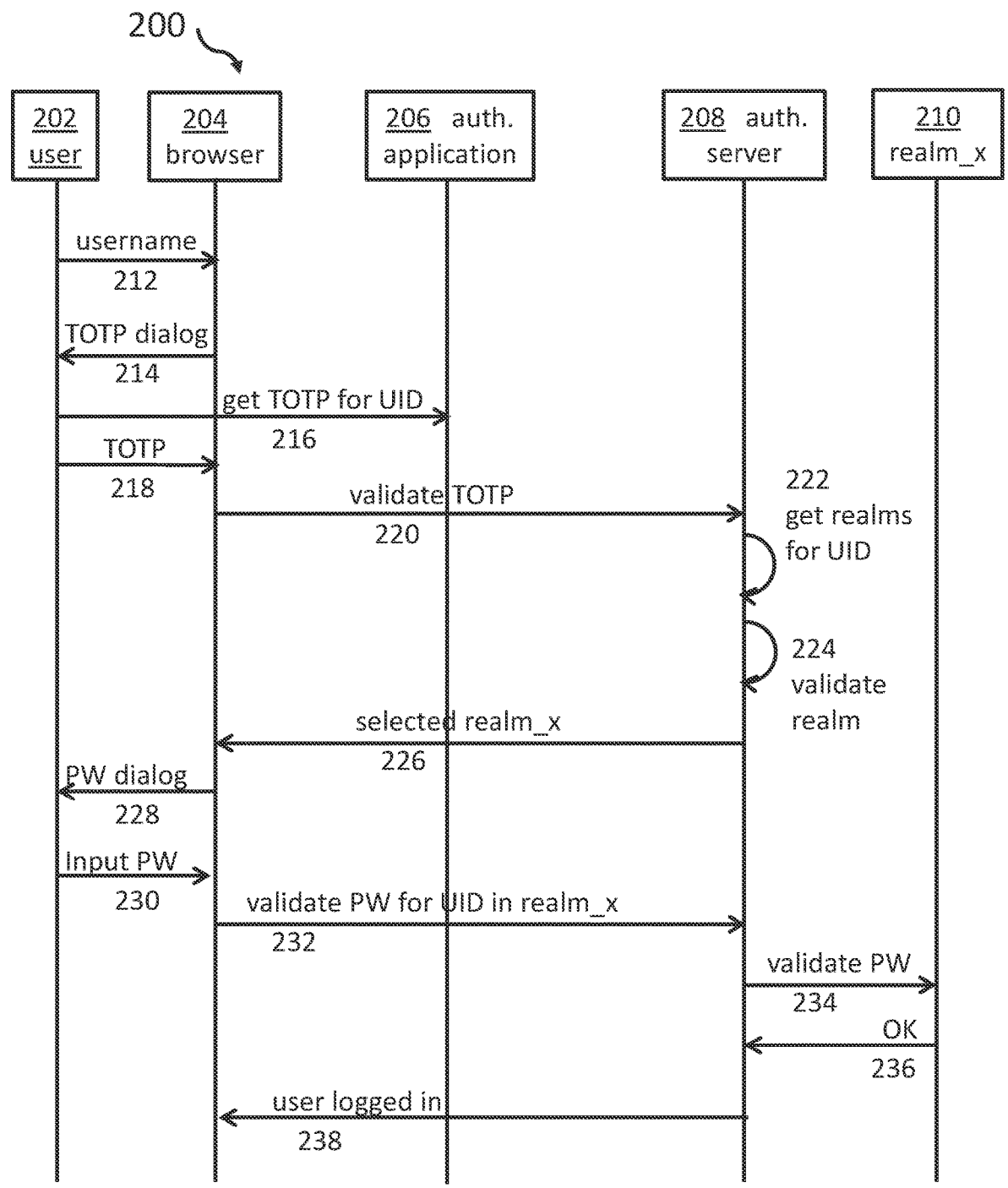
FIG. 5 is a data flow diagram of a an approach for authentication of a username utilizing multiple components, in accordance with an embodiment of the present invention.

FIG. 5 shows a data flow diagram 200 of a practical embodiment of the proposed concept involving the elements user 202, browser 204, authentication application 206, authentication server 208 and realm_x 210, denoting a specific realm with identity or identifier "x."

In a first step, the user 202 provides, 212, their username to the browser 204, i.e., they enter their username. This opens the TOTP dialogue 214 via the client-side authentication application 206. For this, the request "get TOTP code for UID" for the user ID, i.e., the username, is requested, 216, and sent to the authorization application 206. This makes the TOTP code 218 available to the browser 204. From here, the TOTP code is validated, 220, by the authentication server 208 which gets, 222, realms for the UID. Additionally, the realm ID is validated, 224, by the authentication server 208. The then selected realm_x—in particular, a related identifier—is returned, 226, to the browser 204. Based on this the possible dialogue between the browser 204 and the user 202 is started, 228.

After the user has entered, 230, their password relating to their username (i.e., UID), the password and the UID (i.e., the username) is validated, 232, in the realm_x 210. For such a validation, a validation request is sent from the browser 204 to the authentication server 208 which in turn lets the password validate, 234, by the realm_x, 210. A confirmation, e.g., "OK," is returned, 236, to the authentication server 208. Based on this, the authentication server 208 confirms, 238, a user login to realm_x 210. Therefore, the login process described here also uses the two-factor authentication process but in a more convenient way for login processes in realms of cloud computing environments.

Figure 6:
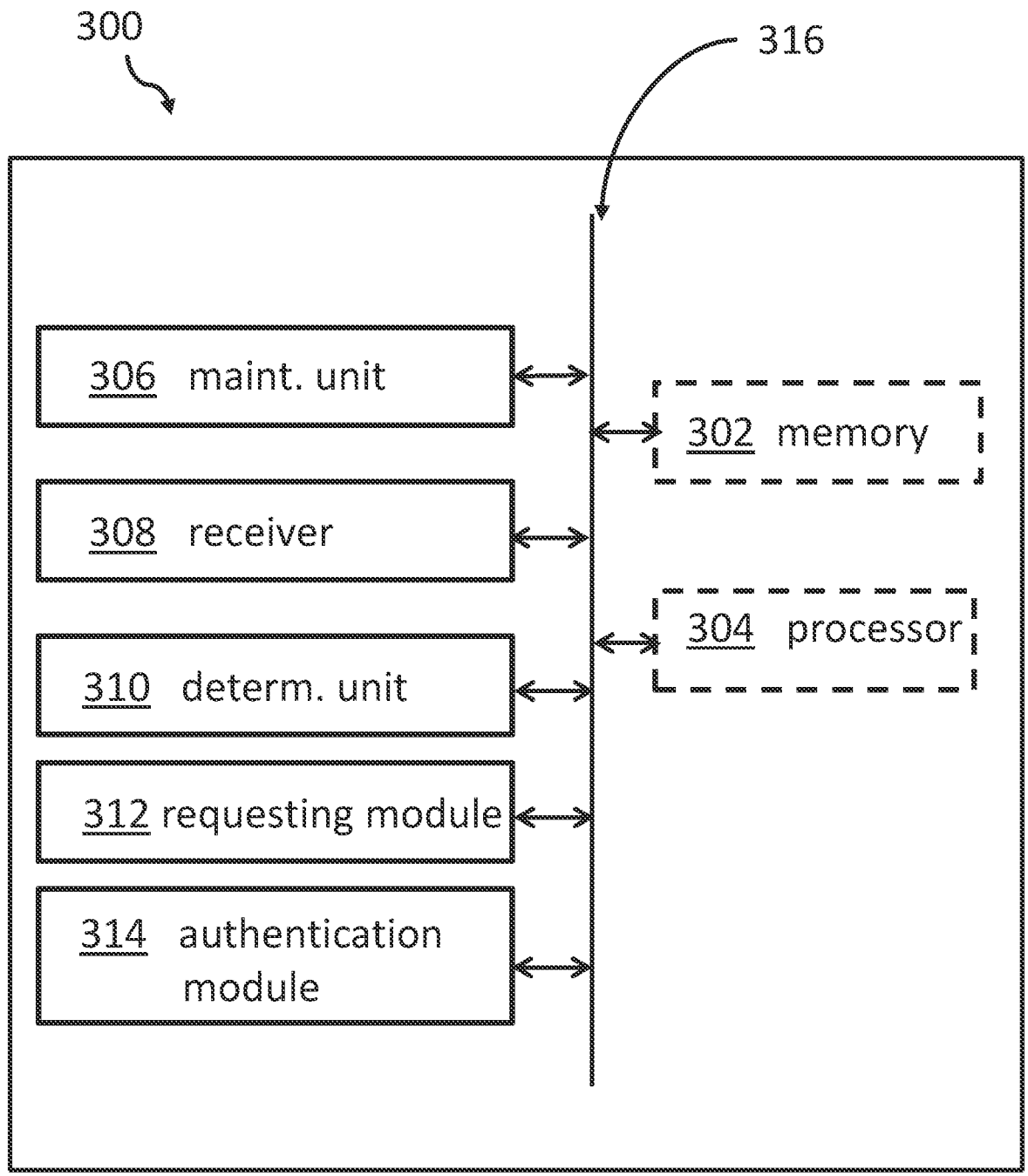
FIG. 6 is a functional block diagram illustrating a computing environment that includes an authentication system, in accordance with an embodiment of the present invention.

FIG. 6 shows a block diagram of an embodiment of the here proposed authentication server 300 for an authentication of a username. The implementation may take place in a combination of a memory 302 or a processor 304 (both are then, communicatively coupled to one another) and parts of program code, which are stored in the memory, so that the processor to may carry out the activities. Alternatively, the functions may also be implemented as part of modules and/or units. The following description reflects both options.

The program code portions are therefore adapted to enable the processor to perform maintaining—e.g., by a maintaining unit 306—a mapping of usernames and realms, and receiving, by a receiver 308—a username and a time-based one-time password code (TOTP code) for the username based on an authentication application.

Program code portions may also enable the processor to: upon receiving the TOTP code, determining—e.g. by a determination unit 310, a realm from the mapping based on the received username and the received TOTP, and requesting—by a requesting module 312, an entry of a credential relating to the username in the realm.

Additionally, the program code portion may also enable the processor to: upon receiving of the requested credential authenticating—e.g. by an authentication module 314—the username by determining that the received credential matched an expected credential for realm.

In case of a hardware implementation, the units and modules can be communicatively coupled for signal and data exchange. This may apply in particular to the memory 302, the processor 304, the maintaining unit 306, the receiver 308, the determination unit 310, the requesting module 312 and the authentication module 314. They may be interconnected in the 1:1 fashion, or alternatively they may be connected to an authentication system internal bus system 316 for data and signal exchange.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

In a nutshell the inventive concept can be summarized as follows:

A method for an authentication of a username, the method comprising: maintaining a mapping of usernames and realms; receiving a username and a time-based one-time password code (TOTP code) for the username based on an authentication application; upon receiving the TOTP code, determining a realm from the mapping based on the received username and the received TOTP; and requesting an entry of a credential relating to the username in the realm; and upon receiving of the requested credential, authenticating the username by determining that the received credential matched an expected credential for the realm.

The method also comprising receiving the username and the TOTP code in two steps.

The method also comprising receiving the username and the TOTP code in a one step process.

The method according to any of the preceding clauses, also comprising providing a user interface adapted for receiving the username and/or the TOTP code.

The method also comprising, wherein the user interface is a graphical user interface or a command line interface.

The method according to any of the preceding clauses, wherein the realm is selected out of the group comprising at least an application in a cloud computing environment, a marketplace, a software development environment, a social media platform component, an Internet shop.

The method according to any of the preceding clauses, wherein the maintaining the mapping is performed by an authentication server.

The method according to any of the preceding clauses, wherein the authentication application is a client-side TOTP code generator.

The method according to any of the preceding clauses, wherein the mapping also comprises TOTP code.

The method according to any of the preceding clauses, wherein the mapping is performed using a table, a linked list or a database.

The method according to any of the preceding clauses, also comprising: determining that the TOTP code is still valid; and upon the TOTP code no longer being valid, terminating a process underlying the method.

An authentication system for an authentication of a username, the authentication system comprising: a memory communicatively coupled to a processor, the memory storing program code portions adapted to enable the processor to perform maintaining a mapping of usernames and realms, receiving a username and a time-based one-time password code (TOTP code) for the username based on a authentication application upon receiving the TOTP code, determining a realm from the mapping based on the received username and the received TOTP, and requesting an entry of a credential relating to the username in the realm, and upon receiving of the requested credential, authenticating the username by determining that the received credential matched an expected credential for the realm.

The authentication system, wherein the program code portions are adapted to enable the processor also to receive the username and the TOTP code in two steps.

The authentication system, wherein the program code portions are adapted to enable the processor also to receive the username and the TOTP code in a one step process.

The authentication system, wherein the program code portions are adapted to enable the processor also to provide a user interface adapted for receiving the username and/or the TOTP code.

The authentication system, wherein the user interface is a graphical user interface or a command line interface.

The authentication system, wherein the realm is selected out of the group comprising at least an application in a cloud computing environment, a marketplace, a software development environment, a social media platform component, an Internet shop.

The authentication system, wherein the maintaining the mapping is performed by an authentication server.

The authentication system, wherein the authentication application is a client-side TOTP code generator.

The authentication system, wherein the mapping also comprises TOTP code.

The authentication system, wherein the mapping is performed using table, a linked list or a database.

The authentication system, wherein the program code portions are adapted to enable the processor also to determining that the TOTP code is still valid, and upon the TOTP code no longer being valid, terminating a process underlying the method.

A computer program product for an authentication of a username, said computer program product comprising a computer readable storage medium having program instructions embodied therewith, said program instructions being executable by one or more computing systems or controllers to cause said one or more computing systems to maintain a mapping of usernames and realms, receive a username and a time-based one-time password code (TOTP code) for the username based on a authentication application upon a reception of the TOTP code, determine a realm from the mapping based on the received username and the received TOTP, and request an entry of a credential relating to the username in the realm, and upon a reception of the requested credential, authenticate the username by determining that the received credential matched an expected credential for the realm.

What is claimed is:

1. A computer-implemented method comprising:
   receiving, by one or more processors, a username and a time-based one-time password (TOTP) for said username based on an authentication application;
   subsequent to receiving said TOTP:
      determining, by one or more processors, a realm from said TOTP, based on a mapping of TOTPs and a plurality of realms; and
      requesting, by one or more processors, entry of a credential relating to said username in said realm; and
   subsequent to receiving said requested credential, authenticating, by one or more processors, said username by determining that said received credential matches an expected credential for said realm.

2. The method of claim 1, further comprising:
   receiving, by one or more processors, said username and said TOTP in two steps.

3. The method of claim 2, further comprising:
   providing, by one or more processors, a user-interface adapted for receiving said username and said TOTP.

4. The method of claim 3, wherein said user interface is a command line interface.

5. The method of claim 1, further comprising:
   receiving, by one or more processors, said username and said TOTP in a single step process.

6. The method of claim 1, wherein said realm is a software development environment.

7. The method of claim 1, wherein said authentication application is a client-side TOTP generator.

8. The method of claim 1, wherein said mapping is performed using a table.

9. The method of claim 1, further comprising:
   determining, by one or more processors, that said TOTP is no longer valid; and
   subsequent to determining that said TOTP is no longer valid, terminating, by one or more processors, a process.

10. A computer program product comprising:
    one or more computer readable storage media, and program instructions collectively stored on the one or more computer readable storage media, the program instructions comprising:

program instructions to receive a username and a time-based one-time password code (TOTP) for said username based on an authentication application;
program instructions to, subsequent to receiving said TOTP:
   determine a realm from said TOTP, based on a mapping of TOTPs and a plurality of realms; and
   request entry of a credential relating to said username in said realm; and
program instructions to, subsequent to receiving said requested credential, authenticate said username by determining that said received credential matches an expected credential for said realm.

11. The computer program product of claim 10, further comprising:
program instructions, collectively stored on the one or more computer readable storage media, to receive said username and said TOTP in two steps.

12. The computer program product of claim 11, further comprising:
program instructions, collectively stored on the one or more computer readable storage media, to provide a user-interface adapted for receiving said username and said TOTP.

13. The computer program product of claim 12, wherein said user interface is a command line interface.

14. The computer program product of claim 10, further comprising:
program instructions, collectively stored on the one or more computer readable storage media, to receive said username and said TOTP in a single step process.

15. The computer program product of claim 10, wherein said realm is a software development environment.

16. The computer program product of claim 10, wherein said authentication application is a client-side TOTP generator.

17. The computer program product of claim 10, wherein said mapping is performed using table.

18. The computer program product of claim 10, further comprising:
program instructions, collectively stored on the one or more computer readable storage media, to determine that said TOTP is no longer valid; and
program instructions, collectively stored on the one or more computer readable storage media, to, subsequent to determining that said TOTP code no longer valid, terminate a process.

19. A computer system comprising:
one or more computer processors, one or more computer readable storage media, and program instructions collectively stored on the one or more computer readable storage media for execution by at least one of the one or more computer processors, the program instructions comprising:
program instructions to receive a username and a time-based one-time password code (TOTP) for said username based on an authentication application;
program instructions to, subsequent to receiving said TOTP:
   determine a realm from said TOTP, based on a mapping of TOTPs and a plurality of realms; and
   request entry of a credential relating to said username in said realm; and
program instructions to, subsequent to receiving said requested credential, authenticate said username by determining that said received credential matches an expected credential for said realm.

20. The computer system of claim 19, further comprising:
program instructions, collectively stored on the one or more computer readable storage media, to receive said username and said TOTP in two steps.

21. The computer system of claim 20, further comprising:
program instructions, collectively stored on the one or more computer readable storage media, to provide a user-interface adapted for receiving said username and said TOTP.

22. The computer system of claim 21, wherein said user interface is a command line interface.

23. The computer system of claim 19, further comprising:
program instructions, collectively stored on the one or more computer readable storage media, to receive said username and said TOTP in a single step process.

24. The method of claim 1, wherein each realm is a sub group of dynamically configurable computing resources in a cloud computing environment.

25. The method of claim 1, wherein said username is associated with the plurality of realms.

* * * * *